United States Patent
Thomas et al.

(10) Patent No.: US 7,937,279 B2
(45) Date of Patent: May 3, 2011

(54) COLLATERAL DAMAGE LIMITS

(76) Inventors: Bruce Bradford Thomas, Trumbull, CT (US); Lester Ware Preston, Darien, CT (US)

( * ) Notice: Subject to any disclaimer, the term of this patent is extended or adjusted under 35 U.S.C. 154(b) by 331 days.

(21) Appl. No.: 12/150,306

(22) Filed: Apr. 28, 2008

(65) Prior Publication Data
US 2008/0208640 A1   Aug. 28, 2008

Related U.S. Application Data (63) Continuation-in-part of application No. 11/249,999, filed on Oct. 13, 2005, now abandoned.

(51) Int. Cl.
*G06Q 40/00* (2006.01)
(52) U.S. Cl. ............................................. 705/4; 705/30
(58) Field of Classification Search .................. 705/4–44
See application file for complete search history.

(56) References Cited

U.S. PATENT DOCUMENTS

| | | | |
|---|---|---|---|
| 6,470,321 B1 * | 10/2002 | Cumming et al. | 705/4 |
| 2003/0078817 A1 * | 4/2003 | Harrison et al. | 705/4 |
| 2003/0083908 A1 * | 5/2003 | Steinmann | 705/4 |
| 2005/0182670 A1 * | 8/2005 | Burgess | 705/4 |
| 2007/0156463 A1 * | 7/2007 | Burton et al. | 705/4 |
| 2008/0154647 A1 * | 6/2008 | Ress | 705/4 |

OTHER PUBLICATIONS

Valerie Mosse, "Protect Your collateral against flood losses", Credit Union Magazine., Madison: Jun. 1998, vol. 64, Issue. 5, p. 35, 2 pages.*
Helen Echmann, "Lender's Insurance: New tools for banks and borrowers", canadian Underwriter, Don Mills: Aug. 2002, vol. 69, Issure 8, p. 34, (2 pages).*
U.S. Appl. No. 10/647,078, filed Nov. 18, 2004, Bruce B. Thomas.
U.S. Appl. No. 10/705,439, filed May 12, 2005, Bruce B. Thomas.
Clyde M. Kahler, Business Interruption Insurance, Philadelphia, 1930, Preface and pp. 16-24.
Gillis, Ellis & Baker, Inc., "Total Plus," Insurance Policy.

* cited by examiner

*Primary Examiner* — Frantzy Poinvil (57) ABSTRACT

A method for marketing and insuring damages that are associated with insured loss events but that are not covered by traditional insurance policies. This method permits the marketing of loss expense coverage, underwriting, and claim adjustment processes of insurance to be performed by reference to the loss payments that are made by a specified insurance policy. By referencing insured loss payments, which both a buyer and a seller understand, this method provides an easy way to communicate and transact something that is otherwise difficult or impossible to define or measure.

50 Claims, 3 Drawing Sheets

COLLATERAL DAMAGE LIMITS

CROSS-REFERENCE TO RELATED APPLICATIONS

This application is a continuation-in-part of nonprovisional patent application Ser. No. 11/249,999, entitled Collateral Coverage Loss Limits, filed on Oct. 13, 2005 now abandoned. This application is technically related to nonprovisional patent application Ser. Nos. 10/647,078 and 10/705,439 and their continuation-in-part patent applications in that it represents a different method for insuring damages that are collateral to insured losses.

FIELD OF INVENTION

This invention is in the field of insurance.

BACKGROUND OF THE INVENTION

Insurance is a means by which the risk of loss is contractually shifted from the insured to the insurer. Under this contractual arrangement, the insured pays a premium to the insurer for agreeing to bear some potential loss that the insured faces. Insurance is a very valuable financial tool that helps individuals and legal entities manage the risks they face.

Insurance works best in instances where the definition of loss is clear and the amount of loss is obvious. If a loss is not easy to define or limit, it should not be insured because it will be difficult or impossible to set an appropriate premium. Moreover, it will result in unduly complex coverage terms, disagreements over coverage interpretation, and difficulties in proving and quantifying losses.

To be eligible to receive insurance payments, insurance buyers must be able to prove that they had losses that fit within the coverage definition of their insurance. Losses can be categorized in many different ways such as life, health, property, casualty, etc. More generally, losses can be categorized as being direct or indirect.

A direct loss is a loss where the insured peril is the proximate cause of the loss. For example, the direct loss of a factory due to a fire would be the cost of rebuilding the factory. The indirect losses would be all of the costs associated with the inconvenience of not having a workable factory. Direct losses, such as the physical cost of the buildings in this example, are typically much easier to estimate than indirect losses such as lost income or extra expenses that may result from such an event. Management and employees must spend time trying to recover from this event, and there is always a significant amount of opportunity cost that can never be adequately assessed.

Indirect losses vary in size depending on the specifics of the loss, but they occur with every type of insurable loss. Traditional insurance can cover certain limited types of indirect costs that can be defined and limited such as the loss of income (business interruption) and "extra" or "expediting" expenses that are necessary to return a business to normal after a loss. However, companies and individuals are not insured against many types of indirect losses because these losses are often too difficult to define or tend to be subject to the discretion of the insured. Policyholders often have considerable discretion over indirect losses, making many types of indirect loss impossible to quantify and subject to significant moral hazard.

The subjective and indeterminate nature of these losses makes these types of indirect losses difficult or impossible to insurer. Since indirect losses are becoming an ever larger part of most companies' loss experience, it is no wonder that companies are increasingly frustrated with traditional insurance.

Transaction Costs

Selecting coverage, defining losses, and meeting other insurance requirements is burdensome for both insurers and their customers. In the year 2001, US property and casualty insurers spent more than $133 billion dollars in brokerage commissions, underwriting, and loss adjustment expenses. This amount represents approximately 39% of the premium dollars that they earned in that year.

Moreover, this amount does not reflect the significant costs that insurance buyers expended in getting coverage, substantiating their losses, and proving that those losses were covered under their insurance policies. The amount of time and expense that is involved in buying insurance and collecting on it can be very discouraging to insurance buyers, and it places new burdens on them when they are least able to deal with them.

Furthermore, disputes about what the cause of a loss was or if it is covered by insurance are common, and many claimants initiate litigation proceedings against their insurers to force them to pay. The inability to define in advance all the losses that they will experience and that will be covered by the policy makes it difficult for the insurance buyer to assess the value of the insurance policy and makes it equally hard on insurers to determine a fair premium.

The high costs of underwriting and loss adjusting are also huge deterrents to companies that would like to finance insurable risk. In effect, the large transaction costs associated with insurance represent a huge barrier that discourages third parties from offering coverage and increases the cost of capital that is necessary to finance risk.

New Approach Needed

Given high transaction costs, the limited risks that can be covered with traditional insurance, and the necessity of defining and proving losses, it becomes clear that traditional insurance is a risk financing solution with significant limitations. Insurance proceeds are supposed to restore the policyholder to the same position that existed before the loss occurred. In practice, this is impossible. Deductibles, coinsurance, and coverage limits mean that insureds will never be fully recompensed for their losses. Moreover, many types of losses that are collateral to insured losses cannot be covered.

Hence there is a long-felt need for insurance buyers to be able to purchase insurance that covers losses that are collateral to traditionally insured losses but that are too difficult to define and limit to be covered by a traditional insurance policy. Insurance buyers need a way to finance these collateral damages in a way that is simple, cost-effective, and economically viable.

Objects and Advantages

The object of the invention is a method for marketing and insuring damages that are associated with insured loss events but that are not covered by traditional insurance policies, i.e. "collateral damages". This method provides a new and cost effective way to finance damages that are too difficult to define and limit to be covered by an insurance policy in the traditional way.

Collateral Damage Limits enables insurers to provide coverage on any risk of loss that is collateral to a traditional insured loss. This method also enables the provision of this coverage in a way that substantially eliminates the underwriting, marketing, and sales costs that are traditionally associated with insurance. Reducing these costs increases profits for coverage sellers and enables them to reduce premiums for coverage buyers.

By streamlining the marketing and underwriting processes that are necessary to provide insurance coverage, collateral damage coverage reduces barriers to entry and enables new companies to finance the risk of collateral damages. This gives insurance buyers access to new sources of risk capital, which is particularly valuable in "hard" insurance markets when traditional insurance prices are high and coverage is difficult to obtain.

Collateral damage coverage also permits access to cheaper sources of capital than any other existing financial alternative. This is because individual insurers exhibit much greater loss volatility than does the insurance industry as a whole. By offering collateral damage coverage to the insureds of many different insurers, a coverage provider can mimic the loss experience of the industry and reduce its loss volatility. This diminishes the amount of capital that is needed to finance this risk, and it reduces the cost of that capital too since investors prefer lower profit volatility. These benefits can then be shared with coverage buyers in the form of lower premiums.

Other objects and advantages will become apparent from a consideration of the ensuing description and drawings.

SUMMARY OF THE INVENTION

The Summary of the Invention is provided as a guide to understanding the invention. It does not necessarily describe the most generic embodiment of the invention or all species of the invention disclosed herein.

This method permits the marketing of loss expense coverage, underwriting, and claim adjustment processes of insurance to be performed by reference to the loss payments that are made by a specified insurance policy. By referencing insured loss payments, which both a buyer and a seller understand, this method provides an easy way to communicate and transact something that is otherwise difficult or impossible to define or limit, i.e. collateral damages.

For example, a company that is interested in offering commercial property insurance could communicate to commercial buyers of insurance that it is willing to provide them with coverage for damages that are collateral to losses that are covered by their traditional insurance policies. It could use this method to communicate the terms and conditions on which this coverage would be offered by referring to their existing insurance policies.

The seller would specify the type of collateral damage that it will insure. For example, it might state that it will pay for amounts that are covered by a traditional insurance policy but not paid by that policy such as deductibles, amounts in excess of policy limits, coinsurance penalties, etc. In addition or as an alternative, it might also describe the collateral damage coverage it is providing by listing particular types of expenses that an insured may experience as a result of an insured loss that are not covered by the insured's traditional insurance policy such as: claim preparation expenses, risk management improvements, consulting expenses, the cost of rebuilding facilities to a higher or different standard than previously existed, human resource expenses, regulatory costs, community impact costs, concessions to vendors and suppliers, financing costs, work-around expenses, marketing and advertising expenses, diversion of management time, etc.

The seller in this example could state for example that it is willing to provide coverage for the collateral damages it has specified up to 20% of any payment that an insured receives from its traditional insurance policy in return for a premium equal to 20% of the premiums that the insured pays for its traditional insurance policy. It could further state for example that it is willing to offer this coverage for all commercial insureds in Massachusetts that pay between $50 thousand and $200 thousand in annual property insurance premiums.

The seller in this example needs no experience or judgment in this particular subset of the insurance market. By referencing the insurance that has already been transacted in this market, the seller has availed itself of the judgments and expertise of the underwriters and loss adjustment experts that are already in the referenced insurance market.

The more specific the seller can be about the terms and conditions under which it will offer this coverage, the more transaction cost it can eliminate. In the foregoing example, the seller has encouraged buyers that meet its specifications and desire this coverage to contact it, and it has discouraged everyone else. In effect, the seller has provided quotes for every insured in the target market it has specified. From this example, one can see that this method can dramatically reduce most of the expense of underwriting and negotiating this coverage.

Using this method buyers know exactly what the coverage is and what it will cost to purchase it without having to do any further investigation. Because the collateral damage coverage terms and conditions have been predefined by reference to an existing insurance policy, traditional underwriting and policy drafting is simple.

When and if there is a loss, the buyer must substantiate the loss as described in the collateral damage insurance policy, as it would with a traditional insurance policy. However, the seller does not need to expend as much time and money on the loss adjustment process as it would if it were writing a traditional insurance policy covering the same expenses because its losses are limited to a specified percentage of the referenced insurance policy's loss payments (20% in this example).

By setting an upper boundary on the insurance limit, insurers can be confident that they are setting the price of coverage at an appropriate level. This method transforms damages that are collateral to traditionally insured losses from something that is subjective and indeterminate into something that is objective, definite, and insurable.

At the conceptual level, this method is very simple. All that is required is for the insurer to state what losses will be covered, the type of proof that the seller requires, and the limit of this coverage in relation to a referenced insurance policy's paid losses.

DETAILED DESCRIPTION—FIGS. 1-3

The following detailed description discloses various embodiments and features of the invention. These embodiments and features are meant to be exemplary and not limiting.

Definitions

The definitions provided below are to be applied to their respective terms or phrases as used herein unless the context of a given particular use of a given term or phrase clearly indicates otherwise.

The term "insurance policy" refers to a written contract between an insured and an insurance company stating the obligations and responsibilities of each party. An insurance policy enables an insured to transfer its own risks to an insurer. Although reinsurance has often been referred to as "insurance for insurance companies", a reinsurance policy differs from an insurance policy in that it enables an insurer to transfer risk that it has assumed via an insurance policy.

The term "collateral damages" refers to economic damages that an insured sustains as a result of an insured loss event but which are not covered by the insured's traditional insurance policy. Because these damages are not already covered, the insured may desire to purchase additional coverage.

The term "collateral damage coverage" or "collateral damage contract" or "collateral damage insurance policy" refers to an insurance policy that finances the risk of loss associated with damages that are collateral to insured loss events but which are not covered by a referenced insurance policy.

The term "contractual payment provision" refers to a provision in an insurance policy that describes the payments that will be due.

The term "collateral damage limit" refers to a limitation on the amount of collateral damages that will be paid by an insurance policy.

The term "all risks commercial property insurance" refers to a commercial property insurance policy that includes business interruption and extra expense coverage.

The term "referenced insurance policy" or "specified insurance policy" refers to an insurance policy that is referenced by a collateral damage contract and from which the collateral damage contract derives its value.

The term "referenced paid losses" refers to the paid insurance losses from which the collateral damage limit will be derived. The referenced paid losses may be all losses that are paid by the referenced insurance policy or they may be a subset of these losses.

The term "coverage subset" refers to referenced paid losses that are quantitatively or qualitatively less than the totality of losses that are covered by the referenced insurance policy.

The term "qualitative coverage subset" refers to any qualitative limitations that may be imposed on the losses paid by the referenced insurance policy, from which the collateral damage payment may be derived. For example, a collateral damage contract might exclude certain types of losses that are covered by the referenced insurance policy. This could be achieved by excluding certain coverage parts, types of coverages, or perils. Qualitative coverage limitations imposed on the referenced insurance policy may be based on many other factors as well.

The term "quantitative coverage subset" refers to any quantitative limitations that may be imposed on the losses paid by the referenced insurance policy, from which the collateral damage payment may be derived. These quantitative limitations may take the form of deductibles, retentions, limits, and coinsurance that are applied to the paid losses of the referenced insurance policy.

The term "function" refers to a mathematical function that will be applied to the referenced paid losses to determine a collateral damage limit that is scaled based on the size of the referenced paid loss. This term refers to both proportional and nonproportional functions, where the limit is scaled based on the size of the referenced paid loss. The term "function" does not include mathematical functions that express a binary output of either zero or a single amount based on the amount of the referenced paid losses.

The term "proportional function" refers to a mathematical function that will be applied to the referenced paid losses to determine a collateral damage limit that is scaled based on the size of the referenced paid loss and that amounts to a constant percentage for every dollar of referenced paid loss. A collateral damage limit that equals 10% of a particular property insurance policy's payments made under Coverage A, excluding losses from hurricanes, less a $5,000 deductible, and subject to an overall limit of $5 million, is an example of a proportional function.

The term "nonproportional function" refers to a mathematical function that will be applied to the referenced paid losses to determine a collateral damage limit that is scaled based on the size of the referenced paid loss and where the proportion of coverage, in relation to the referenced paid losses, changes as the referenced paid losses increase. A nonproportional function is any function that cannot be graphed as a straight line but where the amount of the limit is scaled based on the size of the referenced loss. An example of a nonproportional function is a collateral damage limit that amounts to nothing for the first $100 thousand of referenced paid loss, 10% of insurance loss recoveries between $100 thousand and $1 million, and then 20% of insurance loss recoveries above that amount, subject to an overall limit of $2 million. Exponential and nonlinear mathematical functions are other types of nonproportional functions.

The term "function of premiums" refers to a mathematical function that expresses the cost of collateral damage coverage in relationship to the premiums charged for the referenced insurance policy.

The term "entity" refers to a party to a collateral damage contract such as an individual, married couple, or a legal entity (corporation, limited liability company, partnership, etc.).

The term "buyer" refers to an entity that buys a collateral damage contract. This term encompasses both direct and indirect buyers as well as other entities that are paid by the buyer to assist it to purchase collateral damage coverage such as advisors, brokers, software vendors, information service companies, etc.

The term "direct buyer" refers to an entity that buys a collateral damage contract that references an insurance policy that said entity owns.

The term "indirect buyer" refers to an entity that buys a collateral damage contract that references another entity's insurance policy. For example, an indirect buyer might be the parent company or affiliate of the legal entity that purchased the referenced insurance policy. An indirect buyer might also be an unrelated entity that would be adversely affected if the entity that purchased the referenced insurance policy had a loss.

The term "seller" refers to an entity that sells a collateral damage contract. This term encompasses both direct and indirect sellers as well as other entities that the loss seller pays to help it conduct this business such as advisors, agents, brokers, information service providers, software vendors, underwriters, administrators, claims handlers, etc.

The term "direct seller" refers to an entity that sells a collateral damage contract that references an insurance policy that said entity insured.

The term "indirect seller" refers to an entity that sells a collateral damage contract that references an insurance policy to which said entity is not a party. An indirect seller might be a parent company or affiliate of the insurer that sold the referenced insurance policy or it might be an insurance company that is unrelated to the insurer of the referenced insurance policy.

The term "underwriting" refers to a seller's risk selection process. Underwriting is the process that a seller uses to determine acceptable pricing and coverage terms of the collateral damage coverage it offers. Underwriting includes the process of getting information from and disseminating information to buyers.

The term "underwriter" refers to an individual, an information system, or a legal entity that does underwriting for the benefit of the seller.

The term "commercial" refers to insurance policies that are sold to businesses, commercial institutions, non-profit and not-for-profit companies, professional organizations, governmental institutions, municipalities, etc. Such policies include business auto, businessowners, crime, commercial general liability, commercial property, business interruption and extra expense, boiler and machinery, business life and health, workers compensation, etc. Commercial insurance is contrasted with "personal" insurance.

The term "personal" refers to insurance policies that are sold to individuals and protect individuals against losses to such things as their personal property, their real property, their health, and acts for which they may be liable. This term refers to such insurance policies as personal auto, homeowners, personal property, personal liability, disability, health, accident, life, etc. This term is contrasted with "commercial" insurance.

The term "information system" refers to one or more computers, servers, input devices, output devices, data storage devices, telecommunications equipment and software. Information systems may communicate with other information systems via telecommunications means, such as the Internet. Information systems may also communicate with persons via input/output devices. Persons may communicate with other persons using information systems.

Product Overview

Figure 1:
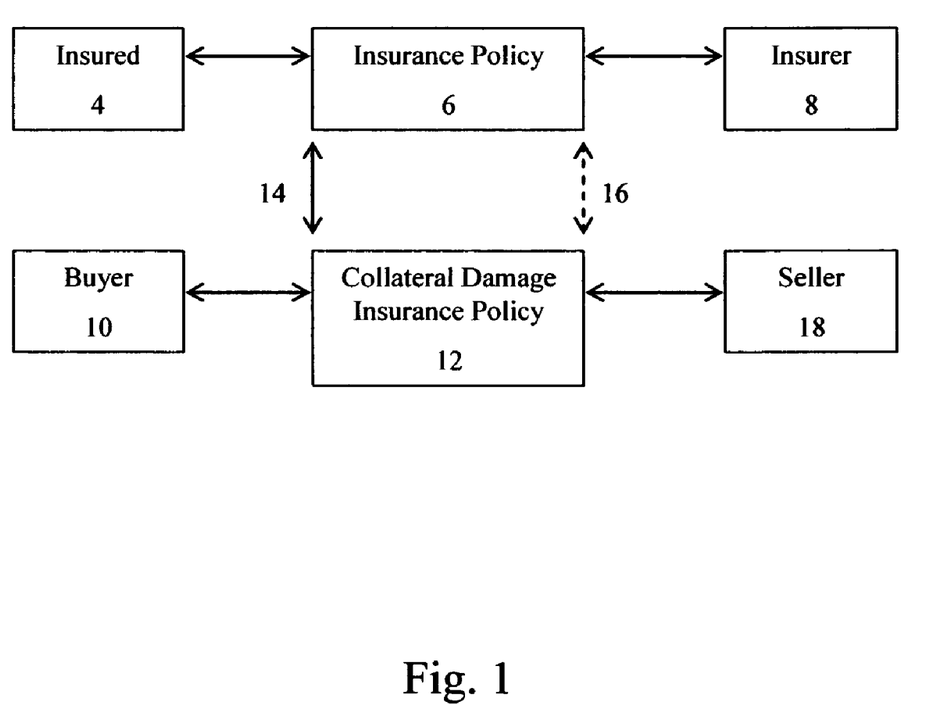
FIG. 1 shows a collateral damage contract that bears a functional relationship between its premiums and the premiums paid for an insurance policy as well as a functional relationship between the limit of the losses paid by the collateral damage contract and the losses paid by an insurance policy.

FIG. 1 shows how a collateral damage insurance policy's premiums and limit may be related to the premiums paid for and the losses recovered under an insurance contract, respectively. It also shows the various parties to these contracts. An insured 4 has an insurance policy 6 with an insurer 8. The insurance policy may have one or more coverage parts and may specify various deductibles, retentions, limits, coinsurance, and exclusions.

A buyer 10 is interested in buying loss protection via a collateral damage insurance policy 12. The buyer may be the insured 4, in which case it would be classified as a "direct buyer", or it may be some other entity that has an interest in the well-being of the insured, in which case it would be classified as an "indirect buyer".

The collateral damage contract's limit 14 is shown as a solid line with two arrows and is a function of the losses that are paid by the specified insurance policy or a coverage subset of said policy. The collateral damage contract's premiums 16 are shown as a dotted line with two arrows as the premiums may or may not be based on a function of the specified insurance policy's premiums.

It is traditional for underwriters to express premiums as dollar amounts, but the nature of a collateral damage contract enables underwriters to express the premium as a function of the insurance policy's premiums, as well. Expressing the premium as a percentage or some other function of the insurance policy's premiums is a highly efficient and beneficial way of communicating the underwriter's intentions and preferences to loss protection buyers.

In this way, buyers can understand the range of feasible collateral damage insurance policies before they have submitted any information to the seller. However the premium is expressed, it must give the buyer value and allow a seller 18 to make money.

The seller 18 may be the same as the insurer 8, in which case it would be classified as a "direct seller", or it may be some other entity that is interested in selling a collateral damage insurance policy, in which case it would be classified as an "indirect seller". A direct seller may use this method to write collateral damage coverage in the form of a separate insurance policy or as an endorsement to the insurance policy that this coverage references.

Marketing Collateral Damage Coverage

Figure 2:
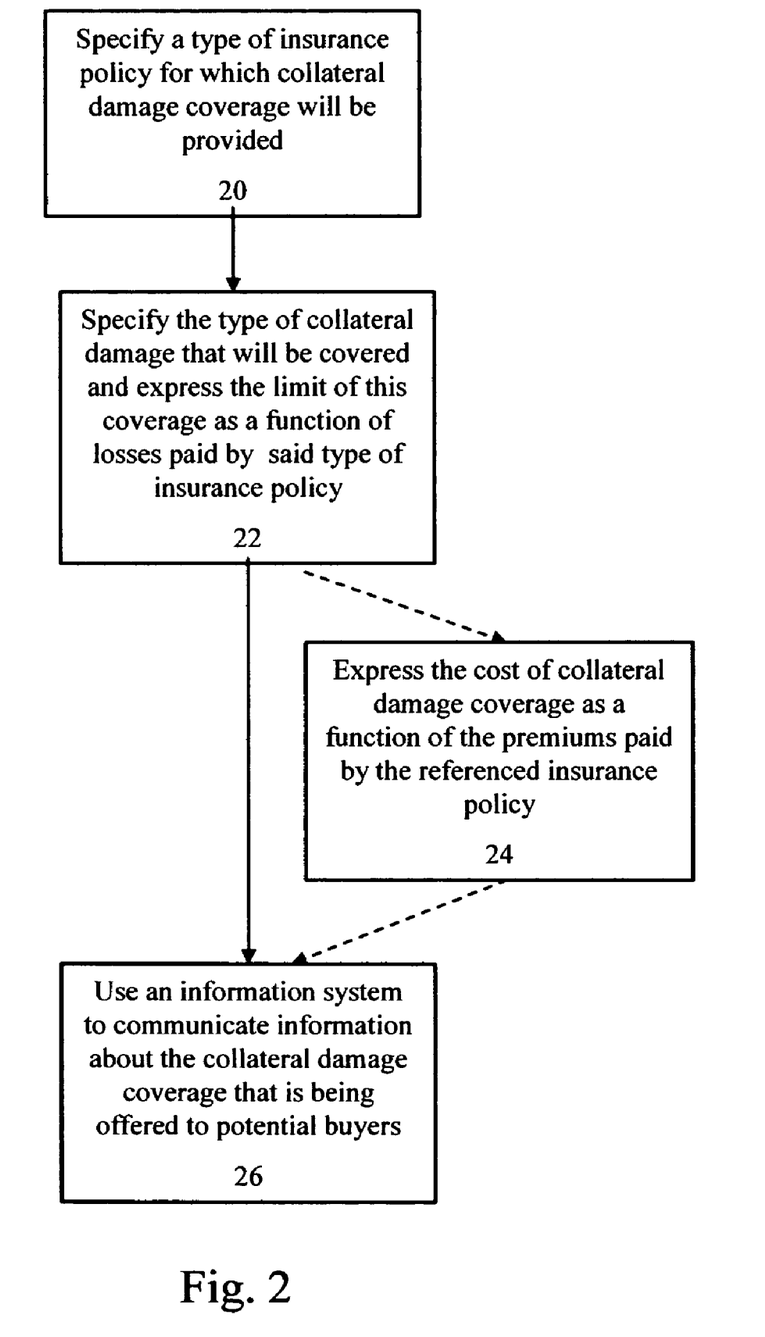
FIG. 2 is a flowchart that demonstrates how this method can be used to market collateral damage coverage.

The flowchart in FIG. 2 illustrates how this business method can be used to market collateral damage coverage to potential buyers. First, a seller must specify a type of insurance policy for which it wants to provide collateral damage 20.

This specification could be as limited as identifying a desire to provide coverage on one or more broad categories of insurance policies such as personal, commercial, property, casualty, health, workers' compensation, disability, accident, etc. Alternatively, the seller might be very specific about the coverage it wants to provide.

For instance, the seller might indicate that it is only willing to provide collateral damage pertaining to a certain type of insurance policy that it has already written. It might state that it is willing to provide this coverage as a separate insurance policy or as an endorsement. More broadly, the seller might specify that it is willing to provide collateral damage coverage on commercial property insurance policies written by other insurance companies covering restaurant chains that are primarily located in Eastern coastal states with between $100 thousand and $200 thousand in annual property premiums.

A seller will make this determination based on its views about how profitable this new business is likely to be and the amount of capital it will need to support this business, including whether this new business will act to diversify its overall portfolio of exposures. The seller in the previous example may think that restaurant chains of the type described are likely to have preferred loss experience in relation to its other opportunities for expansion. It may also desire to offer this coverage because it recognizes that collateral damage coverage provides the seller with an opportunity to learn about the traditional insurance coverage that is being provided to these insureds and the losses that they experience before the seller decides whether or not it makes sense to offer these insureds traditional insurance.

Alternatively a seller may decide that it makes sense to offer collateral damage coverage to a group of insureds without having any detailed knowledge of these exposures or their loss experience. In this case, the seller may rationally conclude that it is up to the insurers to offer traditional insurance on terms that are economically viable and that the seller can make more money than the insurers because it will incur much smaller transaction expenses offering collateral damage coverage. Collateral damage coverage does not require as much operational infrastructure as traditional insurance does because the marketing, underwriting, and loss adjustment processes can be simplified.

Next, the seller must specify the type(s) of collateral damage that it will cover and express the limit of this coverage as a function of the losses paid by this type of insurance policy 22. The seller might simply say that it is covering "collateral damages" and say that these damages are any losses that occur in conjunction with an insured loss event but that are not paid for by the traditional insurance policy that is referenced. Alternatively, the seller might specify some particular type or types of collateral damage that the insured may experience when confronted with an insured loss event that will be insured.

The relationship between the collateral damage limit and the referenced insurance policy may be expressed as a proportional or a nonproportional function. For example, the seller might state that it is willing to provide collateral damage coverage that will pay up to 30% of the losses paid by the referenced insurance policy. This function is critically important because it enables a seller to limit the collateral damages in relation to the specified insurance policy.

No experimentation is required to perform this step because any type of function of losses paid by an insurance policy can be used to define this limit so long as it is truly a mathematical function and unambiguously maps the amount of the referenced paid loss to the limit of the collateral damage coverage.

In the previous example, the collateral damage coverage limit was based on all of the losses paid by the referenced insurance policy. However, the seller may also specify any qualitative or quantitative coverage limitations that it wants to impose by indicating that the function will be based on a coverage subset of the type of insurance policy it has specified. For example, the seller may limit the collateral damage coverage it provides by excluding losses from hurricanes, imposing a franchise deductible equal to $50 thousand, and limiting the overall amount of the losses it will pay to $10 million. Regardless of the function and the qualitative and quantitative coverage subsets that the seller uses to limit the coverage, it must ensure that the maximum payout or limit does not exceed the maximum amount of coverage that the seller is able to offer (also known as "insurance capacity").

Indicating that a seller is willing to provide collateral damage coverage is not nearly as informative as letting potential buyers know that the seller will provide collateral damage coverage to them in particular. It is better still, if the seller is willing to communicate the terms of the coverage it is willing to offer.

Ideally, a seller will express not only the type of insurance policy on which it will base this coverage and the terms and conditions of the collateral damage coverage it will offer, but the cost of this coverage, too 24. This can be done by expressing the cost of the collateral damage coverage as a function of premiums charged for the type of insurance policy that the coverage will reference, i.e. the referenced insurance policy. This step is shown with dotted arrows leading to and from it, because it is not essential to this process.

The seller in the preceding example could indicate that it is willing to offer collateral damage coverage on a pro rata basis. In other words, the buyer can buy an insurance policy with a collateral damage limit equal to 30% of the referenced paid losses, in return for paying 30% of the premiums of the referenced insurance policy.

No experimentation is necessary to set premiums for collateral damage coverage. If the seller believes that the premiums for the referenced insurance are set appropriately, then it can determine the appropriate collateral damage coverage premiums by applying the payment function to the referenced insurance premiums.

If the seller believes that the referenced insurance premiums are mispriced in some way, it can adjust its payment function to ensure that it is receiving an adequate rate on the collateral damage coverage it offers. For example, if the seller feels that the referenced insurance premiums were 10% cheaper than they should have been, it could express that it is willing to provide 30% collateral damage coverage for 33% of the referenced insurance premiums.

The more specific the seller can be about the type and cost of the coverage it is willing to offer, the more useful this information will be, and the more transaction cost that it can eliminate. Assuming that the seller has communicated the type of insurance policies it is willing to reference, the terms and conditions of the collateral damage coverage it offers, and the cost of this coverage, buyers have all the information they need to make a purchase decision.

Finally, the seller uses an information system to communicate information about the collateral damage coverage that it is willing to offer to potential buyers 26. There are many ways that information systems can be employed to market collateral damage coverage to potential buyers. For example, the seller may post this information on its website, may send emails to potential buyers or buyer representatives, may employ telephonic, radio or television communications, and may employ third parties such as managing general agents, insurance brokers, or other marketing or information services to use information systems to convey this information to potential buyers or their representatives.

Depending on the level of automation, certain steps described above may occur in a different sequence or may occur simultaneously. This process may be employed by one information system or several and the steps may be performed in various ways and sequences by multiple parties to make use of existing market structures and to conform to the legal and regulatory requirements of states and governmental entities.

This information may also be conveyed in the form of an electronic interface that enables buyers to get up-to-the-moment information about the coverage that is offered, to determine if they qualify for that coverage, to determine how much the coverage cost, and to input and update information about their exposures. As collateral damage coverage is sold, the seller may find that it needs to limit or alter the coverage it is willing to offer by geographic area, by occupancy, by account size, or any other criteria so that it can stay within its underwriting guidelines. In this case, the ability to quickly alter the coverage information that the seller communicates to buyers is very valuable.

One skilled in the art will recognize that this process makes damages that were previously uninsurable, because they could not be adequately defined or quantified, insurable by reference to damages that are already being insured. This process enables definition and measurement of something that was previously nebulous, enabling a seller to communicate the terms of the collateral damage coverage and the price of this coverage to potential buyers via a brief statement without requiring any detailed information from the insured.

By transmitting one or two sentences of information via internet, radio or television, for example, a seller can convey both the terms of the coverage offered and the cost of the coverage to potential buyers. In effect, the seller can underwrite and quote many insurance policies at once without having to get detailed data from individual insureds. The efficiencies gained by this process are advantageous to both sellers and buyers.

The speed with which information about the seller's ability to offer coverage and its changing risk preferences can be conveyed to potential buyers helps create a much more efficient market for risk transfer. Since sellers can easily transmit this information, they can easily enter and exit areas in the insurance market that they find advantageous.

One who is knowledgeable in the field of insurance will understand that insurance companies engage in numerous transactions and are subject to extensive regulation and oversight. Internal oversight takes place at the transaction level, at the operating unit level, at the division level, and at the company level, but insurance companies are also heavily scrutinized by their shareholders, rating agencies, regulatory bodies, government agencies, and tax authorities. The number of transactions in which they are engaged, the need for accuracy, computational speed, contractual consistency, the amount of analysis that they perform on these transactions, and the amount of oversight all necessitate the use of information systems to carryout this business method.

Method for Providing Collateral Damage Coverage

Figure 3:
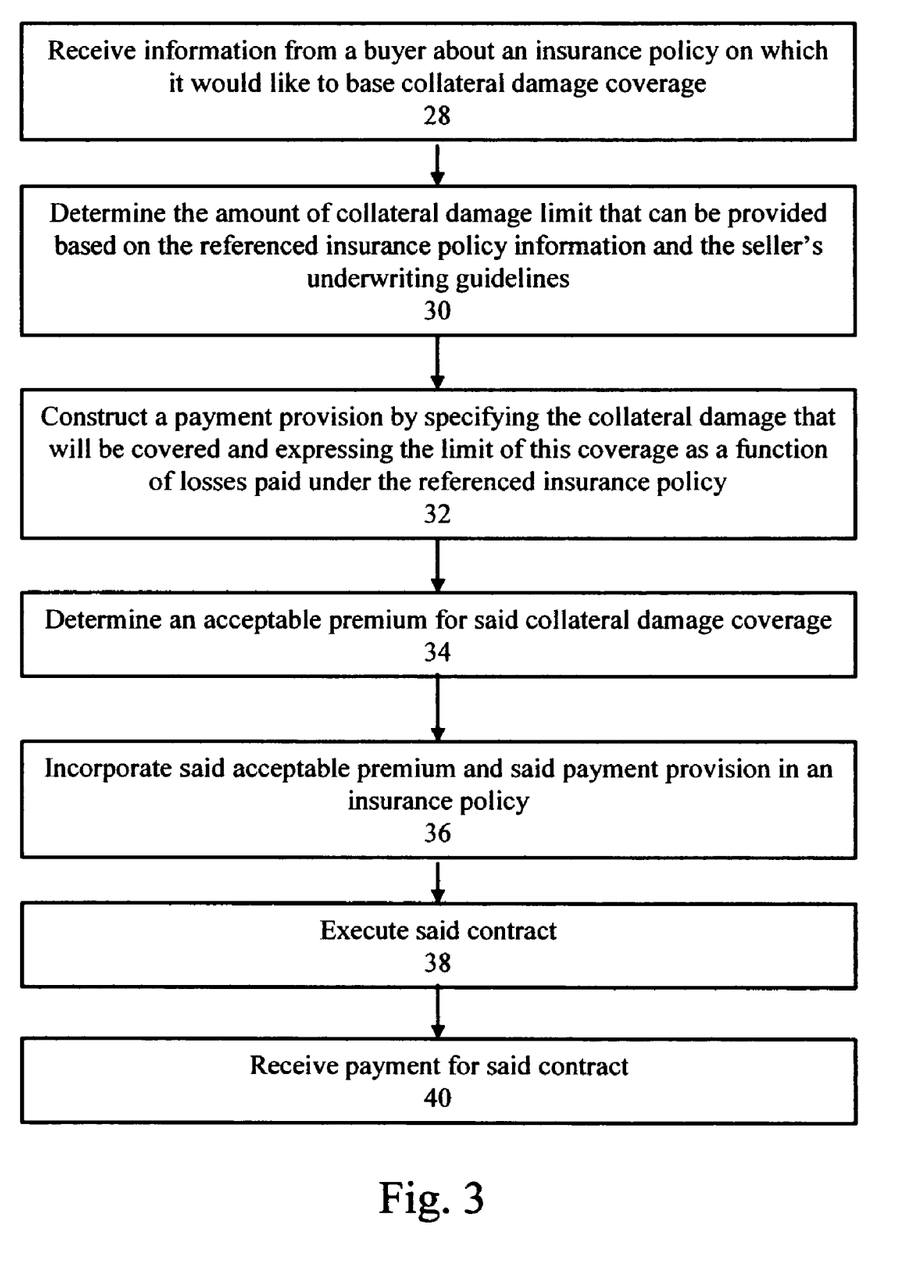
FIG. 3 is a flowchart that demonstrates how this method can be used to provide collateral damage coverage.

The flowchart in FIG. 3 illustrates how this business method can be used to provide collateral damage coverage. First, a seller must receive information from a buyer about an insurance policy on which the buyer would like to base collateral damage coverage 28. The buyer may be a direct buyer or an indirect buyer.

If the buyer is a direct buyer and the seller is a direct seller, the collateral damage coverage policy may be written as an endorsement or a separate insurance policy. In this case, the seller may already have all of the information it needs to underwrite this coverage. However, even if the buyer is merely purchasing an endorsement to its existing coverage it will still need to indicate that it is an existing policyholder and that it desires this additional coverage.

If the buyer is an indirect buyer, the underwriter may also want information that would help demonstrate that there is a relationship between the indirect buyer and the insured under the referenced insurance policy and that the indirect buyer will suffer collateral damages if there is an insured loss under said policy. Regardless of whether the buyer is direct or indirect, the seller must have enough information to determine if its underwriting criteria are met.

Where the underwriter does not have direct knowledge of the referenced insurance policy, it may ask the buyer to provide additional information such as: a copy of the declaration page on the referenced insurance policy; copy of the referenced insurance policy or binder, the amount of the referenced policy's premiums, the last five years loss experience, a schedule of insured values by location showing information related to type of construction, occupancy, protection, exposure rating, and other useful information. The underwriter may also request additional information about prior years' losses, engineering reports, or any other information that it finds useful.

The amount of underwriting information that is requested will vary based on each seller's individual underwriting requirements. Some sellers will want just enough information so that they can determine that an account fits their exposure profile. In this case, a sworn statement that the buyer fits the seller' underwriting criteria may be enough information for a seller to enter into a contract with a buyer. Other sellers may have a great deal of knowledge and experience in a given market segment and may desire to use the information they receive to help them set the collateral damage coverage terms and price.

For exposures that are largely homogenous and diversified and where relatively small amounts of money are at risk, underwriters will desire to stream-line the underwriting process as much as possible. The portfolio effect of having many small exposures helps diversify away the possibility that any one exposure was seriously mispriced.

There is less data available on the risk of loss for larger, more complicated risks. As a result, underwriting tends to be based much more on judgment than on historical loss statistics. Because the premiums charged for these risks are large and there are risk management professionals on both sides of the transaction, there tends to be much more price competition and judgment employed for these types of accounts than for smaller exposures. Since there is so much judgment involved in setting the premiums and coverage terms of the referenced insurance, some sellers may feel that they should employ their own judgment in developing the coverage terms and pricing of the collateral damage coverage.

Ideally underwriting information would be provided electronically via an information system to reduce transaction cost, improve the accuracy of the data, permit the data to be easily manipulated for use by other computerized systems, and to provide summary information about the seller's portfolio of exposures. This can be accomplished in many different ways by using electronic mail, by transmitting the information via data storage devices such as CDs, DVDs, hard drives, and the like. It may also be accomplished by having the buyer or the buyer's representative input information directly into an information system that the seller uses to capture data for underwriting collateral damage coverage.

Using this information and its underwriting guidelines, the seller must determine how much collateral damage coverage it is willing to provide 30. For example, the seller's underwriting guidelines may state that exposures from certain occupancies cannot be accepted, that certain locations are restricted in some way, or that various deductibles and limits must be applied.

The seller may, for example, be concerned about having too much exposure to named windstorms (e.g. hurricanes) and want to keep a close watch on the exposures it insures in the Southeastern U.S. It may find that it is highly advantageous to use its underwriting data in catastrophe models to assess potential damage rates from different catastrophe scenarios, to help it manage its exposure accumulations, and to determine an acceptable price for the exposures it assumes.

Given that coverage terms and prices have already been developed by the insurer of the referenced insurance policy, no experimentation is necessary. Nevertheless, each collateral damage coverage seller will have developed guidelines for the insurance coverage it may offer. These guidelines will be based so as to exceed regulatory thresholds and rating agency requirements, and to meet the specific constraints that each seller sets for itself based on the amount of capital and reinsurance it has.

Having a database that is populated with up-to-date information about the exposures that a seller has underwritten is very useful, particularly for large sellers that have multiple divisions offering insured loss coverage. By reviewing such a database, underwriters working within or on behalf of the seller can be assured that they know of any other policies that the seller has written to the same buyer or on the same referenced insurance policy, before agreeing to provide additional loss protection via collateral damage coverage. With real-time information about the concentration of its exposures, a seller may decide that it makes sense for it to decline to provide coverage, or provide coverage but hedge or reinsure exposures that have grown too large.

Assuming that the collateral damage coverage meets the sellers underwriting guidelines, the underwriter must construct a payment provision by specifying the collateral damage that will be covered and expressing the collateral damage limit as a function of losses paid under the referenced insurance policy 32. This step can be handled manually or it may be accomplished via an information system, where the buyer inputs information directly into an information system about its exposure, selects the coverage it wants based on a menu of choices with which the seller has programmed the information system.

This function can be expressed as a proportional or a nonproportional function of the referenced paid losses. From an economic perspective, the seller should be indifferent to whether the collateral damage limit function is proportional or nonproportional.

The buyer may desire one type of limit function better than another based on how understandable it is and based on how well it matches the collateral damages they expect to have over the range of the referenced insurance policy's paid losses. Proportional limit functions are desirable because they are easy to communicate and understand.

The referenced paid losses may be all of the losses paid by the referenced insurance policy or may be a coverage subset of that policy. The coverage subset may be qualitative or quantitative or both.

Next the seller must determine an acceptable premium for the specified collateral damage coverage 34. The seller may determine this premium by using an information system that calculates the premium of the collateral damage coverage based on the type and amount of coverage and pre-specified relationships with the premiums paid for the referenced insurance policy.

For example, the seller may decide that it wants to be in a particular insurance market and is willing to write collateral damage coverage at the market price. It can do this by agreeing to charge 10% of the referenced insurance policy's premium for a collateral damage coverage limit that equals 10% of the paid losses under the referenced insurance policy. Having specified these relationships, the seller can program these functions into a computer that can then be used to calculate acceptable premiums for the collateral damage coverage that it offers.

Automating the calculation of collateral damage premiums is very useful because it reduces transaction cost, and it improves information flow, timeliness, and accuracy. For larger transactions, a seller may desire to use an underwriter to set an appropriate premium on a case by case basis by using their judgment in conjunction with information that the underwriter can obtain from catastrophe models, databases of historical losses, reviewing the pricing of recent transactions with similar exposures characteristics, and the use of other underwriting tools.

Assuming that the buyer and the seller can agree on the collateral damage coverage limit function and the premium charged for that coverage, the seller must incorporate this information in an insurance policy 36. The seller may use information systems to generate this policy so as to standardize the contract wording, reduce the possibility for errors, and reduce transaction cost.

Next the contract is executed 38. This may be accomplished manually or electronically based on the relevant laws and the preferences of the parties. It is highly advantageous for the seller to update its database of valid contracts and exposures with the pertinent information from each contract as it is executed.

Finally, the seller receives payment for the collateral damage contract 40. This payment may be made manually or may be paid with the use of information systems that are used to improve the flow of funds from the buyer to the seller. The seller may also use an information system to account for this payment in its books and records.

The claim payment process associated with this coverage is similar to other forms of insurance in that the insured must submit proof that it has a valid claim under the terms of the policy. The seller will ensure that the insured has a valid policy and that the amounts claimed are valid under the terms of that policy. The seller will then apply the specified collateral damage limit function and any other applicable policy limits to determine the maximum amount that it should pay under the terms of the collateral damage insurance policy.

The process as shown in FIG. 3 and more fully discussed above can range from a system that is fully automated to a process that uses information systems as needed to accomplish one or more of the process steps outlined above. Depending on the level of automation, certain steps described above may occur in a different sequence or may occur simultaneously and may be performed in various ways and sequences by multiple parties to make use of existing market structures and to conform to the legal and regulatory requirements of states and governmental entities.

One who is knowledgeable in the field of insurance will understand that insurance companies engage in numerous transactions and are subject to extensive regulation and oversight. Internal oversight takes place at the transaction level, at the operating unit level, at the division level, and at the company level, but insurance companies are also heavily scrutinized by their shareholders, rating agencies, regulatory bodies, government agencies, and tax authorities. The number of transactions in which they are engaged, the need for accuracy and computational speed, the amount of analysis that they perform on these transactions, and the amount of oversight employed all necessitate the use of information systems to carryout this business method.

One skilled in the art will recognize that this process enables buyers and sellers to easily and efficiently convey information and transact loss exposures that are, absent the use of this method, difficult to define and quantify. Absent this business method, these exposures would not be insured.

Although sellers may decide to employ judgment at various stages of this process or may employ different underwriting guidelines based on their particular preferences, such judgment is not necessary to use this business method. Sellers with no insurance experience or expertise may mimic the underwriting styles and techniques of any particular segment of the insurance market, or any particular insurer, by charging the same rates and as the insurance policies that are referenced.

This business method enables companies that are not in the insurance business or are not in a particular segment of the insurance business to offer loss coverage by piggybacking off of the work and expertise of the insurance industry's best underwriters and claim adjusters. If they would like to earn more money than the referenced insurance company, sellers can simply charge more for the collateral damage coverage limits they offer or restrict the losses they cover in relation to the referenced insurance.

However, collateral damage coverage sellers have a huge economic advantage over the insurance they reference because of the transaction efficiencies that this business method offers. If sellers follow the referenced insurance policy's coverage and premium terms, their loss ratio will be exactly the same as the referenced insurance, but their expenses may be significantly diminished by streamlining the marketing and underwriting processes necessary to write collateral damage coverage. These transaction efficiencies have the potential to boost profit margins significantly for insurers that write this coverage.

Additional Embodiments

There are numerous embodiments of Collateral Damage Limits. This method can be applied to all types of insurance policies including property, casualty, health, life, disability, workers compensation, accident, homeowners, auto, single peril, multiple peril, etc. Insurers may use this method to write a new policy or an endorsement to an existing policy so as to provide their customers with collateral damage coverage.

This method may be employed by direct and indirect sellers and may be useful to both direct and indirect buyers as a tool for marketing and underwriting insurance policies that cover collateral damages. There are limitless ways of structuring collateral damage coverage by defining the referenced paid losses in terms of quantitative coverage subsets and qualitative coverage subsets. Additionally, there are an infinite variety of proportional and nonproportional functions that may be used to specify a collateral damage limit.

Advantages

From the description above it should be clear that this method enables one to market, underwrite, and provide collateral damage coverage for losses that are too difficult to define and limit to be covered by insurance in the traditional way. By specifying a collateral damage limit as a function of the referenced paid losses of an insurance policy, an insurer can be confident that it will earn at least as much profit on the collateral damage coverage it writes as on the referenced insurance policy.

This method has the potential to reduce insurance transaction costs significantly by simplifying the marketing, underwriting, and negotiation processes necessary to complete an insurance transaction.

This business method also:
a. Allows insurers to offer a new form of coverage to their customers without concern that they have no actuarial data on which to base their underwriting decisions;
b. Permits buyers to receive coverage for losses that are currently difficult or impossible to insure;
c. Enables different insurers to offer loss coverage on the same insured loss events for the same insureds;
d. Gives insurance buyers access to new sources of capital by permitting insurers to offer collateral damage coverage where the referenced insurance policy is written by a different insurer; and
e. Introduces more price competition to the insurance market by reducing the huge infrastructure costs that have been necessary to offer traditional insurance coverage to insurance buyers.

Although the description above contains certain specifics, these should not be construed as limiting the scope of the invention but as merely providing illustrations of some of the presently preferred embodiments of this invention. Clearly this methodology can be applied in many ways to all types of insurance. Thus the scope of the invention should be determined by the appended claims and the legal equivalents, rather than by any particular example described above.

We claim:

1. An information system, comprising:
    a data storage device; and
    a computer linked to the data storage device configured to:
        receive and store underwriting criteria comprising characteristics of insurance policies that a coverage seller is willing to use as a reference basis for forming Collateral Damage Coverage agreements;
        receive information comprising characteristics of an insurance policy that a potential coverage buyer would like to use as the reference basis for forming a Collateral Damage Coverage agreement;
        compare the characteristics of the insurance policy with the underwriting criteria to determine if the insurance policy matches the coverage seller's underwriting criteria for Collateral Damage Coverage agreements; and
        provide a notification that the potential coverage buyer is either eligible or ineligible for the Collateral Damage Coverage agreement based on whether or not the insurance policy matches or does not match the coverage seller's underwriting criteria, respectively.

2. The information system of claim 1, where the underwriting criteria includes an identification of acceptable insurers, and the determining step performed by the computer in response to receiving information comprising characteristics of the insurance policy that the potential coverage buyer would like to use as the reference basis for the Collateral Damage Coverage agreement comprises determining if the insurance policy was underwritten by an acceptable insurer.

3. The information system of claim 1, where the underwriting criteria includes an identification of what constitutes an acceptable premium amount for the insurance policy that the potential coverage buyer would like to use as the reference basis for the Collateral Damage Coverage agreement, and the determining step performed by the computer in response to receiving information comprising characteristics of the insurance policy that the potential coverage buyer would like to use as the reference basis for the Collateral Damage Coverage agreement comprises determining if the premium of the insurance policy meets the underwriting criteria.

4. The information system of claim 1, where the underwriting criteria includes an identification of what constitutes an acceptable covered location, and the determining step performed by the computer in response to receiving information comprising characteristics of the insurance policy that the potential coverage buyer would like to use as the reference basis for the Collateral Damage Coverage agreement comprises determining if the covered locations of the insurance policy meet the underwriting criteria.

5. The information system of claim 1, where the underwriting criteria includes an identification of what constitutes an acceptable type of insurance policy, and the determining step performed by the computer in response to receiving information comprising characteristics of the insurance policy that the potential coverage buyer would like to use as the reference basis for the Collateral Damage Coverage agreement comprises determining if the insurance policy is an all risk commercial property insurance policy.

6. The information system of claim 1, where the underwriting criteria includes an identification of what constitutes an acceptable type of insurance policy, and the determining step performed by the computer in response to receiving information comprising characteristics of the insurance policy that the potential coverage buyer would like to use as the reference basis for the Collateral Damage Coverage agreement comprises determining if the insurance policy is a commercial casualty insurance policy.

7. The information system of claim 1, where the underwriting criteria includes an identification of what constitutes an acceptable type of insurance policy, and the determining step performed by the computer in response to receiving information comprising characteristics of the insurance policy that the potential coverage buyer would like to use as the reference basis for the Collateral Damage Coverage agreement comprises determining if the insurance policy is a personal insurance policy.

8. The information system of claim 1, where the underwriting criteria includes an identification of what constitutes an acceptable type of insurance policy, and the determining step performed by the computer in response to receiving information comprising characteristics of the insurance policy that the potential coverage buyer would like to use as the reference basis for the Collateral Damage Coverage agreement comprises determining if the insurance policy is a health insurance policy.

9. The information system of claim 1, where the underwriting criteria includes an identification of what constitutes an acceptable type of insurance policy, and the determining step performed by the computer in response to receiving information comprising characteristics of the insurance policy that the potential coverage buyer would like to use as the reference basis for the Collateral Damage Coverage agreement comprises determining if the insurance policy is a workers' compensation insurance policy.

10. An information system, comprising:
a data storage device; and
a computer linked to the data storage device configured to:
receive and store a standardized contract wording for a Collateral Damage Coverage agreement that includes contractual terms that are acceptable to a coverage seller and will be offered to coverage buyers, where the contractual terms define the conditions for making a payment under the Collateral Damage Coverage agreement and include at least one acceptable payment limit function that when applied to losses paid under a referenced insurance policy results in a payment limit that increases as losses paid under the referenced policy increase;
receive contractual terms for the Collateral Damage Coverage agreement that are acceptable to the coverage seller, where the contractual terms include a specified referenced insurance policy; and
generate a contractual provision for the Collateral Damage Coverage agreement that specifies the payment limit by applying the acceptable payment limit function to the losses paid by the specified referenced insurance policy and incorporating it into the standardized contract wording.

11. The information system of claim 10, where one of the contractual terms that is acceptable to the coverage seller and offered to coverage buyers is a payment limit that is expressed as a percentage of losses paid under the referenced insurance policy, and the determining step is to generate a contractual provision for the Collateral Damage Coverage agreement that specifies that the payment limit will be a percentage of the losses paid under the referenced insurance policy.

12. The information system of claim 10, where one of the contractual terms that is acceptable to the coverage seller and offered to coverage buyers is a payment limit that is expressed as a non-linear function of losses paid under the referenced insurance policy, and the determining step is to generate a contractual provision for the Collateral Damage Coverage agreement that specifies that the payment limit will be a non-linear function of the losses paid under the referenced insurance policy.

13. The information system of claim 10, where one of the contractual terms that is acceptable to the coverage seller and offered to coverage buyers is a quantitative limitation that would be imposed on the losses paid by the insurance policy, and the determining step is to generate a contractual provision for the Collateral Damage Coverage agreement that specifies that the quantitative limitation would be imposed on the losses paid by the referenced insurance policy before the payment limit function is applied.

14. The information system of claim 10, where one of the contractual terms that is acceptable to the coverage seller and offered to coverage buyers is a qualitative limitation that would be imposed on the losses paid by the insurance policy, and the determining step is to generate a contractual provision for the Collateral Damage Coverage agreement that specifies that the qualitative limitation would be imposed on the losses paid by the referenced insurance policy before the payment limit function is applied.

15. The information system of claim 10, where one of the contractual terms that is acceptable to the coverage seller and offered to coverage buyers is a premium for the Collateral Damage Coverage agreement that is determined by applying the payment limit function to the premium of the referenced insurance policy, and the computer performs the additional step of calculating a premium for the Collateral Damage Coverage agreement.

16. The information system of claim 10, where the contractual terms offered are further limited by a specification that the insurance policy that will serve as the reference basis for the Collateral Damage Coverage agreement is of a certain type.

17. The information system of claim 10, where the contractual terms offered are further limited by a specification that the insurance policy that will serve as the reference basis for the Collateral Damage Coverage agreement must have premiums that fit within some specified range.

18. An information system, comprising:
a data storage device; and
a computer linked to the data storage device configured to:
receive and store contractual terms for a Collateral Damage Coverage agreement, where the terms include a specified referenced insurance policy that will serve as the reference basis for the Collateral Damage Coverage agreement, a premium amount for the specified referenced insurance policy, and a function of premiums that will be used to determine a premium amount for the Collateral Damage Coverage agreement; and
calculate the premium amount for the Collateral Damage Coverage agreement by applying the function of premiums to the premium amount of the specified referenced insurance policy.

19. The information system of claim 18, where the computer calculates the premium for the Collateral Damage Coverage agreement by applying a linear function of premiums to the premium amount of the specified referenced insurance policy.

20. The information system of claim 18, where the computer calculates the premium for the Collateral Damage Coverage agreement by applying a non-linear function of premiums to the premium amount of the specified referenced insurance policy.

21. The information system of claim 18, where the computer performs the further step of generating a notice regarding the premium for the Collateral Damage Coverage agreement.

22. An information system, comprising:
a data storage device; and
a computer linked to the data storage device configured to:
receive and store contractual information for a plurality of valid Collateral Damage Coverage agreements in the data storage device, where the contractual information for each said valid Collateral Damage Coverage agreement includes a referenced insurance policy and a payment limit function for the valid Collateral Damage Coverage agreement that that when applied to losses under a referenced insurance policy results in a payment limit that increases as losses paid under the referenced policy increase;
receive information for a Collateral Damage Coverage claim that includes an identification of a referenced insurance policy where a payment has been made under that policy; and
identify and provide contractual information on the valid Collateral Damage Coverage agreements in the data storage device that identify the same referenced insurance policy as the referenced insurance policy identified in the Collateral Damage Coverage claim information.

23. The information system of claim 22, where the computer performs the further step of calculating the payment limit for the Collateral Damage Coverage agreement by applying the payment limit function for the valid Collateral Damage Coverage agreement to the losses paid under the referenced insurance policy.

24. The information system of claim 22, where the computer performs the further step of generating a notice regarding a claim payment for the Collateral Damage Coverage agreement.

25. The information system of claim 22, where the computer performs the further step of transmitting claim payment information for the Collateral Damage Coverage agreement to a payment system.

26. A computer-implemented method operative for underwriting Collateral Damage Coverage comprising the steps of:
receiving and storing, in a data storage device linked to a computer, underwriting criteria comprising characteristics of insurance policies that a coverage seller is willing to use as a reference basis for forming Collateral Damage Coverage agreements;
receiving and storing, in the data storage device linked to the computer, characteristics of an insurance policy that a potential coverage buyer would like to use as the reference basis for forming a Collateral Damage Coverage agreement;
using the computer to determine if the characteristics of the insurance policy match the coverage seller's underwriting criteria for Collateral Damage Coverage agreements; and
using the computer to provide a notification that the potential coverage buyer is either eligible or ineligible for the Collateral Damage Coverage agreement based on whether or not the insurance policy matches or does not match the coverage seller's underwriting criteria, respectively.

27. The computer-implemented method of claim 26, where the underwriting criteria includes an identification of acceptable insurers, and the computer is used to determine if the insurance policy was underwritten by an acceptable insurer.

28. The computer-implemented method of claim 26, where the underwriting criteria includes an identification of an acceptable premium amount for the insurance policy, and the computer is used to determine if the premium amount for the insurance policy meets the underwriting criteria.

29. The computer-implemented method of claim 26, where the underwriting criteria includes an identification of what constitutes acceptable covered locations for the insurance policy, and the computer is used to determine if the covered locations of the insurance policy meet the underwriting criteria.

30. The computer-implemented method of claim 26, where the underwriting criteria includes an identification of what constitutes an acceptable type of insurance policy, and the computer is used to determine if an all risk commercial property insurance policy meets the underwriting criteria.

31. The computer-implemented method of claim 26, where the underwriting criteria includes an identification of what constitutes an acceptable type of insurance policy, and the computer is used to determine if a commercial casualty insurance policy meets the underwriting criteria.

32. The computer-implemented method of claim 26, where the underwriting criteria includes an identification of what constitutes an acceptable type of insurance policy, and the computer is used to determine if a personal insurance policy meets the underwriting criteria.

33. The computer-implemented method of claim 26, where the underwriting criteria includes an identification of what constitutes an acceptable type of insurance policy, and the computer is used to determine if a health insurance policy meets the underwriting criteria.

34. The computer-implemented method of claim 26, where the underwriting criteria includes an identification of what constitutes an acceptable type of insurance policy, and the computer is used to determine if a workers' compensation insurance policy meets the underwriting criteria.

35. A computer-implemented method operative for constructing contractual wording for Collateral Damage Coverage comprising the steps of:
receiving and storing, in a data storage device linked to a computer, a standardized contract wording for a Collateral Damage Coverage agreement that includes contractual terms that are acceptable to a coverage seller and will be offered to coverage buyers, where the contractual terms define the conditions for making a payment under the Collateral Damage Coverage agreement and include at least one acceptable payment limit function that when applied to losses paid under a referenced insurance policy results in a payment limit that increases as losses paid under the referenced insurance policy increase;
receiving and storing, in the data storage device linked to the computer, contractual terms for a Collateral Damage Coverage agreement that are acceptable to the coverage seller, where the contractual terms include a specified referenced insurance policy; and
using the computer to generate a contractual provision for the Collateral Damage Coverage agreement that specifies the payment limit by applying the acceptable payment limit function to the losses paid by the specified referenced insurance policy and incorporating it into the standardized contract wording.

36. The computer-implemented method of claim 35, where the computer is used to generate the contractual provision for the Collateral Damage Coverage agreement and said contractual provision specifies that the payment limit will be a percentage of the losses paid under the specified referenced insurance policy.

37. The computer-implemented method of claim 35, where the computer is used to generate the contractual provision for the Collateral Damage Coverage agreement and said contractual provision specifies that the payment limit will be a non-linear function of the losses paid under the specified referenced insurance policy.

38. The computer-implemented method of claim 35, where the computer is used to generate the contractual provision for the Collateral Damage Coverage agreement and said contractual provision specifies that a quantitative limitation will be imposed on the losses paid by the specified referenced insurance policy before the payment limit function is applied.

39. The computer-implemented method of claim 35, where the computer is used to generate the contractual provision for the Collateral Damage Coverage agreement and said contractual provision specifies that a qualitative limitation will be imposed on the losses paid by the specified referenced insurance policy before the payment limit function is applied.

40. The computer-implemented method of claim 35, where the computer is used to perform the further step of calculating a premium for the Collateral Damage Coverage agreement by applying the payment limit function to the premium of the specified referenced insurance policy.

41. The computer-implemented method of claim 35, where the computer is used to generate the contractual provision for the Collateral Damage Coverage agreement and said contractual provision is based on an a personal insurance policy that serves as the specified referenced insurance policy.

42. The computer-implemented method of claim 35, where the computer is used to generate the contractual provision for the Collateral Damage Coverage agreement and said contractual provision is based on a commercial casualty insurance policy that serves as the specified referenced insurance policy.

43. A computer-implemented method operative for calculating Collateral Damage Coverage premiums, comprising the steps of:
receiving and storing, in a data storage device linked to a computer, contractual terms for a Collateral Damage Coverage agreement, where the terms include a specified referenced insurance policy that will serve as the reference basis for the Collateral Damage Coverage agreement, a premium amount for the specified referenced insurance policy, and a function of premiums that will be used to determine a premium amount for the Collateral Damage Coverage agreement; and
using the computer to calculate the premium amount for the Collateral Damage Coverage agreement by applying the function of premiums to the premium amount of the specified referenced insurance policy.

44. The computer-implemented method of claim 43, where the computer calculates the premium for the Collateral Damage Coverage agreement by applying a linear function of premiums to the premium amount of the specified referenced insurance policy.

45. The computer-implemented method of claim 43, where the computer calculates the premium for the Collateral Damage Coverage agreement by applying a non-linear function of premiums to the premium amount of the specified referenced insurance policy.

46. The computer-implemented method of claim 43, where the computer is used to perform the further step of generating a notice regarding the premium for the Collateral Damage Coverage agreement.

47. A computer-implemented method operative for evaluating the validity of Collateral Damage Coverage agreement claims, comprising the steps of:
receiving and storing, in a data storage device linked to a computer, contractual information for a plurality of valid Collateral Damage Coverage agreements, where the contractual information for each said valid Collateral Damage Coverage agreement includes a referenced insurance policy and a payment limit function that when applied to losses paid under the referenced insurance policy results in a payment limit that increases as losses paid under the referenced insurance policy increase;
receiving and storing, in the data storage device linked to the computer, information for a Collateral Damage Coverage claim that includes an identification of an insurance policy where a payment has been made under that policy; and
using the computer to provide contractual information on the valid Collateral Damage Coverage agreements in the data storage device that specify the referenced insurance policy identified in the Collateral Damage Coverage claim information.

48. The computer-implemented method of claim 47, where the computer is used to perform the further step of calculating the payment limit for the valid Collateral Damage Coverage agreement by applying the payment limit function to the losses paid under the referenced insurance policy.

49. The computer-implemented method of claim 47, where the computer is used to perform the further step of generating a notice regarding a claim payment for the Collateral Damage Coverage agreement.

50. The computer-implemented method of claim 47, where the computer is used to perform the further step of transmitting claim payment information for the Collateral Damage Coverage agreement to a payment system.

* * * * *